(12) United States Patent
Amurri et al.

(10) Patent No.: US 12,728,578 B2
(45) Date of Patent: Sep. 8, 2026

(54) METHOD FOR EXTRUDING A SEMI-FINISHED PRODUCT MADE OF ELASTOMERIC MATERIAL

(71) Applicant: PIRELLI TYRE S.P.A., Milan (IT)

(72) Inventors: Cesare Emanuele Amurri, Milan (IT); Fabio Cicognani, Milan (IT); Emanuele Luca Schiavon, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 376 days.

(21) Appl. No.: 18/248,824

(22) PCT Filed: Nov. 30, 2021

(86) PCT No.: PCT/IB2021/061099
§ 371 (c)(1),
(2) Date: Apr. 12, 2023

(87) PCT Pub. No.: WO2022/118182
PCT Pub. Date: Jun. 9, 2022

(65) Prior Publication Data

US 2023/0373147 A1 Nov. 23, 2023

(30) Foreign Application Priority Data

Dec. 1, 2020 (IT) ........................ 102020000029222

(51) Int. Cl.
*B29C 48/14* (2019.01)
*B29C 48/00* (2019.01)
(Continued)

(52) U.S. Cl.
CPC .......... *B29C 48/14* (2019.02); *B29C 48/0012* (2019.02); *B29C 48/2552* (2019.02);
(Continued)

(58) Field of Classification Search
CPC ......... B29C 48/00; B29C 48/14; B29C 48/92; B29C 48/18
(Continued)

(56) References Cited

U.S. PATENT DOCUMENTS 4,721,589 A * 1/1988 Harris ..................... B29C 48/05 264/40.6
10,499,662 B1 * 12/2019 Kristensen ......... G01B 11/0608
2016/0290334 A1 * 10/2016 Overend ................. B29B 7/728

FOREIGN PATENT DOCUMENTS

DE 10129707 A1 12/2002
EP 1638756 A1 3/2006
(Continued)

OTHER PUBLICATIONS

International Search Report and Written Opinion issued for International PCT Application No. PCT/IB2021/061099 filed on Nov. 30, 2021 on behalf of Pirelli Tyre S.P.A. Mail Date: Mar. 9, 2022. 10 pages.

(Continued)

*Primary Examiner* — Nahida Sultana
*Assistant Examiner* — Debjani Roy
(74) *Attorney, Agent, or Firm* — Steinfl + Bruno LLP

(57) ABSTRACT

A method for extruding a semi-finished product made of elastomeric material. An elastomeric material is fed to an inlet channel of a gear pump with an inlet pressure value and dispensed through an exit channel of the gear pump with an exit pressure value greater than the inlet pressure value. The method detects the exit pressure value and adjusts the operation of the gear pump to maintain a predetermined pressure difference between the exit pressure and the inlet pressure based on the detection of the exit pressure value.

15 Claims, 3 Drawing Sheets

(51) Int. Cl.
*B29C 48/255* (2019.01)
*B29C 48/37* (2019.01)
*B29C 48/92* (2019.01)

(52) U.S. Cl.
CPC .............. *B29C 48/37* (2019.02); *B29C 48/92* (2019.02); *B29C 2948/92019* (2019.02)

(58) Field of Classification Search
USPC ........................................................ 264/40.7
See application file for complete search history.

(56) References Cited

FOREIGN PATENT DOCUMENTS

| | | | |
|---|---|---|---|
| EP | 3278951 | A1 | 2/2018 |
| JP | 2006327174 | A | 12/2006 |
| JP | 2007237508 | A | 9/2007 |
| JP | 2008229967 | A | 10/2008 |
| JP | 2012000949 | A | 1/2012 |
| JP | 2018030345 | A | 3/2018 |
| JP | 2019081288 | A | 5/2019 |
| WO | 2005/000559 | A1 | 1/2005 |
| WO | 2012/001492 | A1 | 1/2012 |
| WO | 2017/109744 | A1 | 6/2017 |

OTHER PUBLICATIONS

First Chinese Office Action for Chinese Application No. 202180077398.7 filed on Nov. 30, 2021 on behalf of Pirelli Tyre S.P.A. Mail Date: Dec. 11, 2025 14 pages (English + Original).

* cited by examiner

METHOD FOR EXTRUDING A SEMI-FINISHED PRODUCT MADE OF ELASTOMERIC MATERIAL

CROSS-REFERENCE TO RELATED APPLICATIONS

The present application is the U.S. National Stage of International Patent Application No. PCT/IB2021/061099 filed on Nov. 30, 2021, which, in turn, claims priority to Italian Patent Application No. 102020000029222 filed on Dec. 1, 2020.

The present invention relates to a method for extruding a semi-finished product made of elastomeric material.

Preferably, the aforementioned method is used in a process for building a tyre for vehicle wheels.

A tyre for vehicle wheels generally comprises a carcass structure comprising at least one carcass ply formed by reinforcing cords incorporated in a matrix of elastomeric material. The carcass ply has end edges engaged with respective annular anchoring structures. The latter are arranged in the areas of the tyre normally identified as "beads" and each of them is normally formed by a substantially circumferential annular insert on which at least one filling insert is applied in a radially outer position thereof. Such annular inserts are commonly identified as "bead cores" and they have the task of keeping the tyre firmly fixed to the anchoring seat specifically provided in the rim of the wheel, thus preventing, during operation, the radially inner end flap of the tyre from coming out from such a seat.

At the beads it is possible to provide specific reinforcing structures having the function of improving the transmission of torque to the tyre.

In "tubeless" tyres, an airtight covering layer, usually called "liner", covers the inner surfaces of the tyre.

A crown structure is associated in a radially outer position with respect to the carcass structure.

The crown structure comprises a belt structure and, in a radially outer position with respect to the belt structure, a tread band made of elastomeric material.

The belt structure comprises one or more belt layers, arranged radially juxtaposed over one another and having textile or metallic reinforcing cords having crossed orientation and/or an orientation substantially parallel to the direction of circumferential extension of the tyre.

Between the carcass structure and the belt structure it is possible to provide a layer of elastomeric material, called "under-belt", having the function of making the radially outer surface of the carcass structure as uniform as possible for the subsequent application of the belt structure.

Between the belt structure and the tread band it is possible to arrange a layer of elastomeric material, called "underlayer", having suitable properties to obtain a stable union of the tread band to the belt structure.

Respective sidewalls made of elastomeric material are applied on the side surfaces of the carcass structure, each extending from one of the side edges of the tread band up to the respective annular anchoring structure.

A tyre for vehicle wheels thus comprises a plurality of component made of elastomeric material. These may include, as non-limiting examples: the tread band, the sidewalls, the layers called under-belt and/or underlayer, the liner, etc.

The aforementioned components can be made from semi-finished products made of elastomeric material which are obtained through an extrusion process carried out in an extrusion device. The extruded semi-finished product is deposited on a forming support. The modes of deposition can be different (for example, according to adjacent coils and/or at least partially juxtaposed coils) depending on the component to be made.

The expression "elastomeric material" is used to indicate a composition comprising at least one elastomeric polymer and at least one reinforcing filler. Preferably, such a composition also comprises additives like, for example, a cross-linking agent and/or a plasticizer. Thanks to the provision of the cross-linking agent, such a material can be cross-linked through heating, so as to form the end product.

The expression "semi-finished product made of elastomeric material" is used to indicate an elongated element obtained as a result of an extrusion process of the elastomeric material. Such a semi-finished product is thus made of only elastomeric material and typically has a flat shape.

The expression "component made of elastomeric material" is used to indicate any component of the tyre, or a part thereof, obtained through the aforementioned semi-finished product made of elastomeric material.

The expressions "downstream" and "upstream" are used with reference to a feeding direction of the material inside an extrusion device. Therefore, assuming for example a feeding direction from right to left, a "downstream" position with respect to any reference element indicates a position to the left of said reference element and an "upstream" position indicates a position to the right of said reference element.

The expression "thermal inertia" of a structural unit of an extrusion device is used to indicate the tendency of a structural unit to resist to temperature changes; it is greater the greater the mass of material constituting that structural unit.

The expression "operating temperature" of a structural unit of the extrusion device is used to indicate the temperature at which such a structural unit is kept during the extrusion process.

The term "yield of a gear pump" is used to indicate the ratio between the real volume of elastomeric material transported by the pump in one revolution and the internal free volume which the pump could theoretically transport in one revolution.

WO 2012/001492, to the same Applicant, describes an extrusion device for extruding a semi-finished product made of elastomeric material, the extrusion device being used in a process for building a tyre for vehicle wheels. The extrusion device comprises four different structural units. A first structural unit is defined by a hollow body having a longitudinal axis. The hollow body comprises, at an upstream end portion thereof, a loading hopper for loading the elastomeric material to be extruded. A second structural unit is defined by an extrusion screw rotatably mounted inside the hollow body. The extrusion screw acts as a moving member of the elastomeric material inside the hollow body. In particular, it moves the elastomeric material from the upstream end portion of the hollow body to a downstream end portion of the hollow body. A third structural unit of the extrusion device is defined by a gear pump assembly operatively associated with the hollow body at the downstream end portion thereof. Such a gear pump assembly receives the elastomeric material transported by the extrusion screw and pushes it under pressure downstream. A fourth structural unit is defined by a nozzle associated with the gear pump assembly downstream of it. Through such a nozzle the elastomeric material pushed by the gear pump assembly is drawn in the form of semi-finished product, to then be deposited on the outer surface of a forming support.

JP2008229967 illustrates an extrusion apparatus comprising a screw that drives and transports the raw material and a gear pump. The apparatus also comprises: a detection area of the exit pressure of the gear pump in which the exit pressure is detected on the exit side of the gear pump, and a control area of the inlet pressure of the gear pump in which the inlet pressure is gradually controlled on the inlet side of the gear pump based on the aforementioned exit pressure, so that the exit pressure of the gear pump is less than the pressure resistance value set at the exit side of the gear pump at the start of the extrusion.

Extrusion devices and methods are also described in JP2019081288, JP2018030345, JP2012000949, JP2007237508, EP1638756, EP3278951.

The Applicant has observed that in the extrusion processes used in the building of tyres for vehicle wheels, it is desired to have a continuity of flow rate of elastomeric material exiting from the extrusion device, both to avoid having structural defects and/or discontinuities in the extruded semi-finished product (and therefore in the component made of elastomeric material) and to allow depositions of the elastomeric semi-finished product on the forming support that are repeatable and equal to each other (and therefore a process reproducibility). In order to obtain the desired continuity of flow rate it is necessary to have a continuous filling of the gear pump by the elastomeric material and this is typically done by regulating the rotation speed of the extrusion screw so as to keep the pressure value upstream of the gear pump substantially constant.

The Applicant has however observed that in the extrusion processes carried out by keeping the inlet pressure into the gear pump constant, there may be an undesired variability of flow rate and/or weight of the extruded semi-finished product both during successive extrusion cycles of a same elastomeric material and during a single extrusion cycle.

In the attempt to identify the causes of such a variability of weight of the extruded semi-finished product, the Applicant has observed the curves representing the development over time of the pressure of the elastomeric material exiting from the gear pump (hereinafter also indicated as "pressure curves") and has noted that the pressure of the elastomeric material exiting from the gear pump can vary both during successive extrusion cycles of a same elastomeric material and during a single extrusion cycle.

The Applicant believes that the pressure variations of the elastomeric material exiting from the gear pump are determined by variations in viscosity of the elastomeric material caused by temperature variations of the elastomeric material.

In particular, the Applicant believes that the pressure variations of the elastomeric material exiting from the gear pump during successive extrusion cycles are determined by the fact that in the waiting time between the two successive extrusion cycles the elastomeric material present downstream of the gear pump tends to cool down due to the missing mechanical action of the extrusion screw, increasing the viscosity thereof. The longer the aforementioned waiting time, the greater such an increase in viscosity. When a new extrusion cycle begins, the elastomeric material, having a greater viscosity, causes a rise of the pressure exiting from the nozzle, creating a pressure peak that drops as the extrusion cycle continues and as the elastomeric material heats up due to the mechanical action of the extrusion screw.

The Applicant has also noted that during a same extrusion cycle, the pressure variation of the extruded semi-finished product is more accentuated in the case in which the initial viscosity of the elastomeric material is higher. The Applicant believes that this is due to the fact that the time necessary to bring the elastomeric material back to the predetermined viscosity value is greater (with respect to the case in which the initial viscosity value is less), with a consequent longer time necessary to lower the pressure of the elastomeric material exiting from the gear pump.

The Applicant also believes that during a same extrusion cycle, fluctuations of the pressure value of the extruded semi-finished product can be caused both by the different thermal inertia of the structural units, and by small and localized variations of composition of the elastomeric material in transit within the extrusion device.

Again by observing the aforementioned pressure curves, the Applicant has noted that, under the same conditions, in the extrusion cycles carried out by keeping the inlet pressure into the gear pump substantially constant and having pressure curves in which the average of the pressure values is higher, the weight of the extruded semi-finished product is lower with respect to that found in the extrusion cycles having pressure curves in which the average of the pressure values is lower.

The Applicant has therefore observed that the pressure variation of the elastomeric material exiting from the nozzle both during a same extrusion cycle and during successive extrusion cycles causes a weight variation, per unit length, of the extruded semi-finished product. Since the inlet pressure to the gear pump is kept substantially constant, the aforementioned pressure variation results in a variation of the pressure difference between inlet and exit of the gear pump.

The Applicant has verified that the variation of pressure difference between inlet and exit from the gear pump causes a variation of the instantaneous yield of the gear pump. In particular, the Applicant has verified that an increase in the pressure difference between inlet and exit of the gear pump corresponds to a decrease in the instantaneous yield of the gear pump and a consequent decrease in the amount (and therefore the weight) of the extruded elastomeric material, whereas a decrease in the pressure difference between inlet and exit of the gear pump corresponds to an increase in the instantaneous yield of the gear pump and a consequent increase in the amount (and therefore the weight) of the extruded elastomeric material.

Document JP2008229967 teaches to control the inlet pressure to the gear pump only at the start of the extrusion cycle and does not give solutions to obtain a substantial constancy of the extruded elastomeric material at every extrusion cycle, whereas document WO2012/001492 as well as the other cited documents do not offer solutions to the problem outlined above.

The Applicant has however perceived that, since the flow rate of elastomeric material exiting from the extrusion device is substantially proportional to the instantaneous yield of the gear pump and since the instantaneous yield of the gear pump is linked to the pressure difference between inlet and exit of the gear pump, it is possible to obtain a substantially constant flow rate of elastomeric material exiting from the extrusion device while keeping the instantaneous yield of the gear pump substantially constant and that it is possible to achieve this result by making the gear pump operate so that the development of the pressure of the elastomeric material at the inlet of the gear pump follows substantially the development of the pressure of the elastomeric material at the exit of the gear pump.

The Applicant has finally found that by adjusting the pressure at the inlet of the gear pump as a function of the pressure at the exit of the gear pump so as to maintain a predetermined difference between inlet pressure and exit pressure, the amount of semi-finished product made of elastomeric material being deposited remains substantially constant.

The present invention therefore relates, in a first aspect thereof, to a method for extruding a semi-finished product made of elastomeric material.

Preferably, an elastomeric material is fed to an inlet channel of a gear pump.

Preferably the elastomeric material has, in said inlet channel, an inlet pressure value.

Preferably, said elastomeric material is dispensed through an exit channel of the gear pump.

Preferably, the elastomeric material has, in said exit channel, an exit pressure value.

Preferably, said exit pressure value is greater than said inlet pressure value.

Preferably, said exit pressure value is detected.

Preferably, an operation of said gear pump is adjusted so as to maintain a predetermined pressure difference between said exit pressure and said inlet pressure based on said detection.

In a second aspect thereof, the invention relates to a process for building a tyre for vehicle wheels.

Preferably, a semi-finished product made of elastomeric material is made.

Preferably, the semi-finished product made of elastomeric material is deposited on a forming support.

Preferably, in order to make the semi-finished product made of elastomeric material the extrusion method according to the previous aspect is used.

The Applicant believes that when the elastomeric material increases its viscosity, due for example to the waiting time between one extrusion cycle and the next, and the exit pressure at the exit of the gear pump consequently increases up to a maximum reference value, the inlet pressure at the inlet of the gear pump can be increased to obtain that the pressure difference between exit and inlet of the gear pump remain equal to a predetermined pressure value. A certain instantaneous yield of the gear pump and thus a given flow rate of elastomeric material extruded per unit time corresponds to such a pressure difference. When the viscosity of the elastomeric material decreases, for example due to the heating of the elastomeric material carried out by the extrusion screw, the exit pressure at the exit of the gear pump decreases and the inlet pressure at the inlet of the gear pump can be decreased to ensure that the pressure difference between exit and inlet of the gear pump continues to remain set equal to the predetermined pressure value. Continuing to vary the inlet pressure at the inlet of the gear pump, within a predetermined range of inlet pressures, as a function of the exit pressure at the exit of the gear pump, the pressure difference between exit and inlet of the gear pump remains substantially constant and equal to the predetermined pressure value substantially for the entire duration of the extrusion cycle irrespective of possible, undesired and unpredictable variations in viscosity of the elastomeric material.

As stated, a certain instantaneous yield of the gear pump and a given flow rate of elastomeric material extruded per unit time corresponds to such a pressure difference. Such a flow rate thus remains substantially constant during the entire extrusion cycle and in successive extrusion cycles. Such a constancy of flow rate allows a substantial constancy of amount (or weight) of extruded semi-finished product and a substantial process repeatability.

By providing an inlet pressure variation within a predetermined inlet pressure range it is also ensured that the gear pump is always correctly fed at useful pressures suitable for correct operation of the gear pump, obtaining the operating integrity thereof.

Possible inlet pressures outside of the predetermined range of inlet pressures would become necessary only in anomalous cases and in any case for extremely short extrusion times with respect to the total extrusion time of an extrusion cycle, so that the amount of semi-finished product deposited overall remains substantially constant both during one extrusion cycle and in successive extrusion cycles.

In at least one of the aforementioned aspects, the present invention can have at least one of the preferred features described hereinafter.

Preferably, before feeding the elastomeric material to said inlet channel, a predetermined minimum inlet pressure value is set.

Preferably, before feeding the elastomeric material to said inlet channel, a predetermined maximum inlet pressure value is set.

Preferably, said predetermined range of inlet pressure values is comprised between said predetermined minimum inlet pressure value and said predetermined maximum inlet pressure value.

The predetermined minimum inlet pressure value can be set as the minimum pressure value such that, given a specific elastomeric material to be used, a continuous filling of the gear pump is obtained.

Preferably, said predetermined minimum inlet pressure value is equal to, or greater than, 20 bar.

Preferably, said predetermined minimum inlet pressure value is equal to, or greater than, 30 bar.

Preferably, said predetermined minimum inlet pressure value is equal to, or greater than, 40 bar.

Preferably, said predetermined minimum inlet pressure value is equal to, or greater than, 50 bar.

Preferably, said predetermined minimum inlet pressure value is less than 70 bar.

The predetermined maximum inlet pressure value can be set as the maximum pressure value such that, given a specific gear pump to be used, the gear pump and/or the extrusion screw upstream thereof are not damaged due to feeding pressures that are too high.

Preferably, said predetermined maximum inlet pressure value is equal to, or less than, 200 bar.

Preferably, said predetermined maximum inlet pressure value is equal to, or less than, 180 bar.

Preferably, said predetermined maximum inlet pressure value is equal to, or less than, 150 bar.

Preferably, said predetermined maximum inlet pressure value is equal to, or less than, 130 bar.

Preferably, said predetermined maximum inlet pressure value is greater than 120 bar.

Preferably, after having detected the exit pressure, a reference inlet pressure value is calculated as the difference between the exit pressure value and said predetermined pressure difference.

Preferably, when the reference inlet pressure value is greater than the predetermined minimum inlet pressure value and less than the predetermined maximum inlet pressure value, the difference between the exit pressure value and the inlet pressure value is set as equal to said predetermined pressure difference.

Preferably, when the reference inlet pressure value is less than said predetermined minimum inlet pressure value, the inlet pressure is adjusted so that the inlet pressure value is set as equal to said predetermined minimum inlet pressure value.

In this way, the gear pump is never fed with pressures of the elastomeric material below the predetermined minimum inlet pressure value, allowing the full and continuous filling of the gear pump with elastomeric material in every operating condition.

Preferably, when the reference inlet pressure value is greater than said predetermined maximum inlet pressure value, the inlet pressure is adjusted so that the inlet pressure value is set as equal to said predetermined maximum inlet pressure value.

In this way, the gear pump is never fed with pressures of the elastomeric material above the predetermined maximum inlet pressure value, thus having feeding pressures such as not to damage the gear pump and/or the extrusion screw in every operating condition.

Preferably, a minimum exit pressure value is predetermined.

Preferably, a maximum exit pressure value is predetermined.

Preferably, said predetermined pressure difference is calculated as a function of said minimum exit pressure values and maximum exit pressure value.

The Applicant believes that by calculating the constant pressure value as a function of said minimum exit pressure value and maximum exit pressure value it is possible to make extrusion cycles in which, for a significant time period of the extrusion cycle, the inlet pressure at the inlet of the gear pump is not set at values greater than the predetermined maximum inlet pressure value and at values lower than the predetermined minimum inlet pressure value.

Said time period is that at which the reference inlet pressure value is greater than the predetermined maximum inlet pressure value and lower than the predetermined minimum inlet pressure value.

Preferably, said minimum exit pressure value is predetermined by carrying out at least one reference extrusion cycle before feeding the elastomeric material to said inlet channel.

Preferably, said maximum exit pressure value is predetermined by carrying out at least one reference extrusion cycle before feeding the elastomeric material to said inlet channel.

Preferably, said reference extrusion cycle is carried out through said gear pump.

Preferably, said reference extrusion cycle is carried out with said elastomeric material.

In this way, the reference extrusion cycle is capable of providing a minimum exit pressure value and a maximum exit pressure value which are similar, if not identical, to those actually reached during an actual extrusion cycle.

The Applicant believes that in this way the instantaneous yield of the gear pump is substantially constant for the entire extrusion cycle. Such an instantaneous yield differs from the constant value only when the extrusion cycle has anomalous pressure curves having peaks of exit pressure at the exit of the gear pump above the maximum exit pressure value or below the minimum exit pressure value of the reference extrusion cycle. Therefore such an occurrence, even when it happens, last a very short time (when compared to the total duration of the extrusion cycle), allowing the significant times during which the instantaneous yield of the gear pump is not constant to be minimized.

Preferably, in the case in which the type of elastomeric material is changed between one extrusion cycle and the next, a new reference extrusion cycle is carried out to determine said minimum exit pressure value and said maximum exit pressure value.

Preferably, said predetermined pressure difference is calculated according to the formula DP=[(HEV+LEV)/2]−[(PHIV+PLIV)/2], where HEV indicates said maximum exit pressure value, LEV indicates said minimum exit pressure value, PHIV indicates said predetermined maximum inlet pressure value and PLIV indicates said predetermined minimum inlet pressure value.

The Applicant believes that there is a correlation between the maximum exit pressure value and the minimum exit pressure value of any extrusion cycle, so that the maximum and minimum exit pressure values do not vary independently from one another. The Applicant has observed that, the elastomeric material and nozzle being the same, successive extrusion cycles can have different pressure curves in which an increase in the maximum exit pressure value usually corresponds to an increase (not necessarily identical) of the minimum exit pressure value. Equally, the Applicant has observed that, the elastomeric material and nozzle being the same, successive extrusion cycles can have different pressure curves in which a decrease in the maximum exit pressure value usually corresponds to a decrease (not necessarily identical) of the minimum exit pressure value.

The Applicant believes that the formula DP=[(HEV+LEV)/2]−[(PHIV+PLIV)/2] makes it possible to calculate the predetermined pressure difference to be set so that even for extrusion cycles that have pressure curves not identical to the pressure curve of the reference extrusion cycle, the instantaneous yield of the pump remains substantially constant for much of the extrusion cycle.

Preferably, detecting the exit pressure is repeated continuously during feeding said elastomeric material.

Preferably, the calculation of the reference inlet pressure value is carried out at every detection of the exit pressure.

Preferably, the adjustment of the inlet pressure at the inlet of the gear pump is carried out at every detection of the exit pressure.

In this way, the inlet pressure at the inlet of the gear pump is adjusted with continuity by following the development of the pressure of the elastomeric material exiting from the gear pump.

Preferably, the calculation of said predetermined pressure difference is carried out before dispensing the elastomeric material.

Preferably, adjusting the inlet pressure comprises adjusting the rotation speed of an extrusion screw which feeds the elastomeric material to the gear pump.

Further characteristics and advantages of the present invention will become clearer from the following detailed description of a preferred embodiment thereof, made with reference to the attached drawings. In such drawings.

Figure 1:
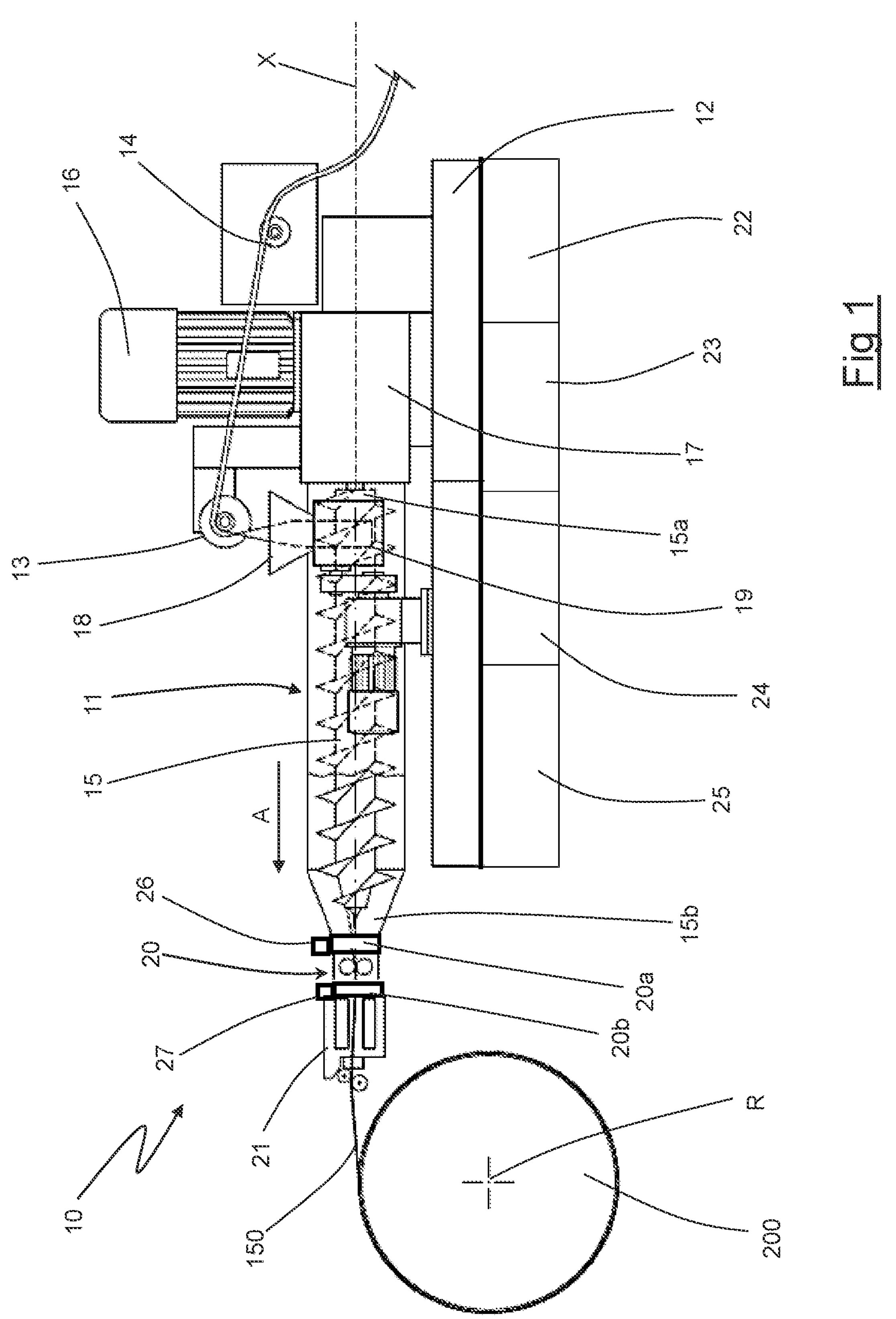
FIG. 1 is a schematic view of a longitudinal section of a preferred embodiment of an extrusion device which can be used in an extrusion method in accordance with the present invention.
Figure 3:
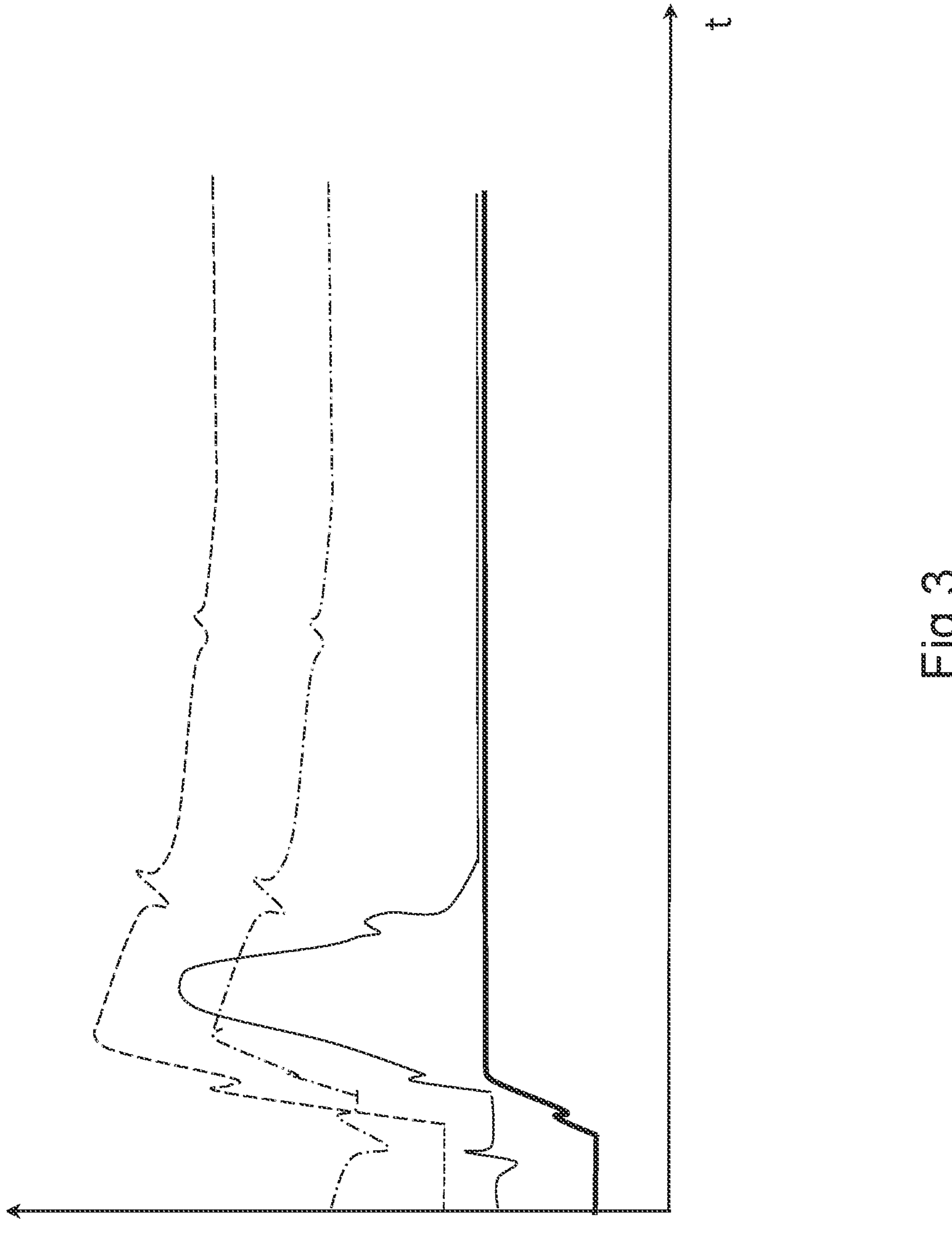

FIG. 3 schematically and qualitatively illustrates the development over time of the inlet and exit pressures at the inlet/exit of a gear pump of the extrusion device of FIG. 1 as the speed of the extrusion screw varies, as well as the development of the flow rate of the elastomeric material extruded through the aforementioned extrusion device.

The present invention has a preferred embodiment thereof in a process for building a tyre for vehicle wheels.

The aforementioned process preferably comprises the building, on a first forming support, of a carcass structure comprising at least one carcass ply and a pair of annular anchoring structures and the building, on a second forming support, of a crown structure comprising at least one belt structure and a tread band. The carcass structure and the crown structure so built are associated with each other so as to obtain a green tyre. Such a green tyre is subsequently transferred to a molding and vulcanization line to obtain the end product.

Alternatively, the process for building a tyre for vehicle wheels, in which the present invention has practical application, can provide for the single components of the tyre to be built directly, according to a predetermined sequence, on a single forming support, generally toroidal.

In the processes described above, the components made of only elastomeric material (like for example the tread band, the sidewalls, the layers called under-belt and/or underlayer, the filling inserts of the annular anchoring structures, the liner, the under-liner, the sidewall inserts, the reinforcing inserts, etc.) are obtained from a semi-finished product 150 made of elastomeric material. Such a semi-finished product 150 is obtained by extrusion of the elastomeric material in an extrusion device 10 of the type illustrated in FIG. 1 and is deposited on a forming support 200 while the latter is moved around its own rotation axis R, so as to make a deposition preferably according to adjacent and/or at least partially juxtaposed coils, depending on the component to be made.

The extrusion device 10 comprises an extruder body 11 defined by a substantially cylindrical hollow body having a longitudinal axis X. The extruder body 11 is preferably mounted on a support block 12 that is located in a position adjacent to that taken up by the forming support 200 on which the semi-finished product 150 is deposited.

The elastomeric material is fed to the extruder body 11 for example through at least one feeding roller 13 and at least one guide roller 14 mounted on the support block 12 upstream of the extruder body 11, on the opposite side with respect to the forming support 200.

The extruder body 11 comprises an extrusion screw 15 extending along the longitudinal axis X and configured to move the elastomeric material inside the extruder body 11 along a feeding direction A parallel to the longitudinal axis X.

The extrusion screw 15 comprises opposite end portions, inlet portions 15*a* and exit portions 15*b*, respectively.

A motor group 16, preferably mounted on the support block 12, provides the extrusion screw 15 with the rotation motion. Between the motor group 16 and the extrusion screw 15 it is possible to provide a reduction gear 17.

The extruder body 11 comprises, at the inlet portion 15*a* of the extrusion screw 15, a loading hopper 18 for loading the elastomeric material coming from the feeding roller 13.

Again at the inlet portion 15*a* of the extrusion screw 15, and downstream of the loading hopper 18 with reference to the feeding direction A, the extruder body 11 can comprise a motorized roller 19 configured to receive the elastomeric material coming from the hopper 18 and feed it, along the feeding direction, to the extrusion screw 15. The motorized roller 19 can be arranged below the hopper 18 and beside the inlet portion 15*a* of the extrusion screw 15, in other words not aligned with the extrusion screw 15. Alternatively, the motorized roller 19 can be arranged upstream of the inlet portion 15*a* of the extrusion screw 15, under the hopper 18 and aligned with the extrusion screw 15.

The extrusion device 10 comprises, downstream of the extruder body 11, in other words close to the exit portion 15*b* of the extrusion screw 15, a gear pump 20, through which the elastomeric material exiting from the extruder body 11 passes.

The gear pump 20 comprises an inlet channel 20*a*, through which the elastomeric material enters into the gear pump 20 and an exit channel 20*b* through which the elastomeric material exits from the gear pump 20. The inlet channel 20*a* is arranged downstream of the extruder body 11, in other words close to the exit portion 15*b* of the extrusion screw 15.

In the embodiment illustrated in FIG. 1, a nozzle 21 is associated with the gear pump 20 on the opposite side to the extruder body 11. Through such a nozzle 21, the elastomeric material pushed by the gear pump 20 is drawn to form the semi-finished product 150 having desired shape and size, which is then deposited on the forming support 200.

In an alternative embodiment (not illustrated) of the extrusion device 10, it is possible to use as drawing member of the elastomeric material, instead of the nozzle 21, a different device suitable for giving the semi-finished product 150 the desired shape and size (for example a pair of calendering rollers).

The exit channel 20*b* of the gear pump 20 is arranged upstream of the nozzle 21.

The extrusion device 10 also comprises a plurality of heat-regulating units each intended to adjust the temperature at a specific area of the extrusion device 10.

Preferably, a heat-regulating unit 22 associated with the extruder body 11 at the hopper 18 and a heat-regulating unit 23 associated with the extruder body 11 at the extrusion screw 15 are provided, so as to be able to keep the area of the extruder body 11 upstream of the extrusion screw 15 at a different operating temperature from that of the area of the extruder body 11 in which the extrusion screw 15 is provided.

In the embodiment illustrated in FIG. 1, a heat-regulating unit 24 associated with the gear pump 20 and a heat-regulating unit 25 associated with the nozzle 21 are also provided.

Each heat-regulating unit can be actuated to heat the respective areas to predetermined operating temperatures that can also be different from each other.

The extrusion device 10 comprises a first pressure sensor 26 configured to detect the pressure of the elastomeric material in the inlet channel 20*a* of the gear pump 20.

The extrusion device 10 also comprises a second pressure sensor 27 configured to detect the pressure of the elastomeric material in the exit channel 20*b* of the gear pump 20.

The extrusion device 10 is configured to firstly carry out a reference extrusion cycle during which an elastomeric material of the same type as that which will be used to deposit the semi-finished product 150 on the forming support 200 is fed to the extrusion device 10.

Such an elastomeric material is fed into the extruder body 11 through the hopper 18.

The extrusion screw 15 is set in rotation with a rotation speed suitable for obtaining a desired pressure of the elastomeric material in the inlet channel 20*a* of the gear pump 20. Such a pressure is a function of known parameters like for example the properties (for example the viscosity) of the elastomeric material and the operating temperature of the various areas of the extrusion device 10 (thermo-regulated through the heat-regulating units 22, 23, 24, 25). Such known parameters are the same ones that will be used during the extrusion cycles of the elastomeric material to deposit the semi-finished product 150 on the forming support 200.

As an example, it is wished to obtain a pressure in the inlet channel 20*a* of the gear pump 20 of about 50 bar, which will correspond to a certain speed of the extrusion screw 15. The first pressure sensor 26 detects the pressure in the inlet channel 20*a* of the gear pump 20 making it possible, if necessary, to vary the speed of the extrusion screw 15 so that the elastomeric material reaches a pressure value equal to 50 bar in the aforementioned inlet channel 20*a*.

Preferably, such a pressure value in the inlet channel 20*a* is kept constant during the reference extrusion cycle.

The gear pump 20 is activated and the elastomeric material previously fed into the inlet channel 20*a* is pushed by the gear pump 20 into the exit channel 20*b* to be extruded through the nozzle 21.

The reference extrusion cycle is actuated for the time necessary to deposit the desired amount of semi-finished product 150 on the forming support 200.

Figures 2A, 2B:
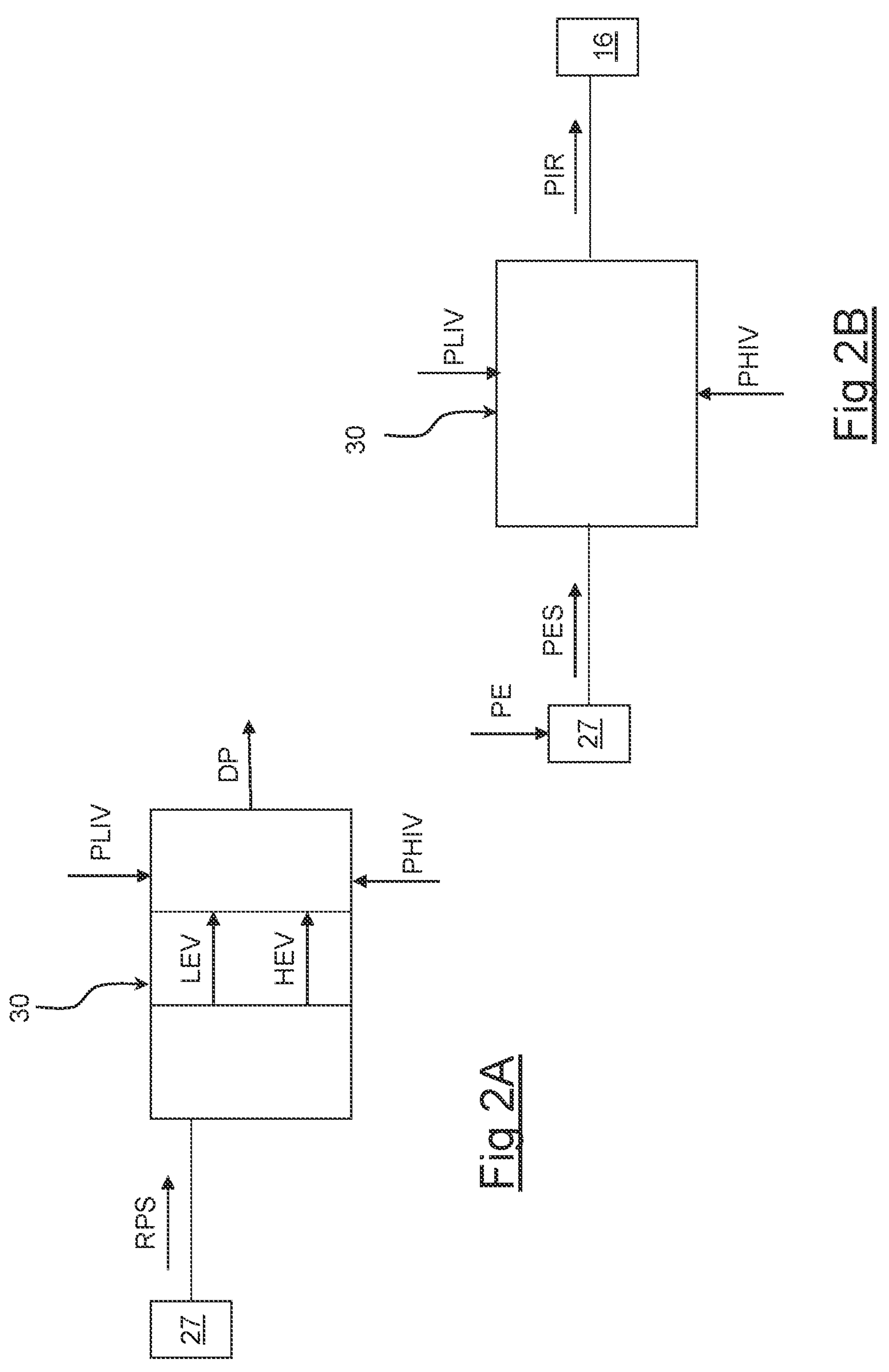
FIGS. 2A and 2B are block diagrams representative of some components of the extrusion device of FIG. 1.

As schematically illustrated in FIG. 2A, during the entire reference extrusion cycle, the second sensor 27 detects the pressure of the elastomeric material in the exit channel 20*b* of the gear pump 20 and sends to a processing unit 30 RPS signals representative of the detected pressures. The processing unit 30 determines and provides a maximum exit pressure value HEV and a minimum exit pressure value LEV reached by the elastomeric material at the exit of the gear pump 20 during the reference extrusion cycle. Such maximum exit pressure value HEV and minimum exit pressure value LEV represent the upper and lower extremes of the pressure curve of the reference extrusion cycle.

As an example, two reference extrusion cycles carried out by the Applicant in an extrusion device of the type illustrated in FIG. 1 with two different elastomeric materials provided, in the first cycle, a maximum exit pressure value HEV equal to 260 bar and a minimum exit pressure value LEV equal to 150 bar and, in the second cycle, a maximum exit pressure value HEV equal to 290 bar and a minimum exit pressure value LEV equal to 180 bar.

Subsequently, or preliminarily to the reference extrusion cycle, a predetermined minimum inlet pressure value PLIV and a predetermined maximum inlet pressure value PHIV are acquired, calculated or estimated.

The predetermined minimum inlet pressure value PLIV is the minimum pressure value of the elastomeric material in the inlet channel 20*a* of the gear pump 20 sufficient to allow a correct filling of the gear pump 20 with the elastomeric material. The predetermined minimum inlet pressure value PLIV can thus be acquired, calculated or estimated once the gear pump 20 in use and the type of elastomeric material that must be used in the extrusion cycle intended to deposit the semi-finished product 150 on the forming support 200 are known.

The predetermined maximum inlet pressure value PHIV is the maximum pressure value of the elastomeric material in the inlet channel 20*a* of the gear pump 20 beyond which the gear pump 20 and/or the extrusion screw 15 could be damaged or in any case not operate correctly. The predetermined maximum inlet pressure value PLIV can thus be acquired, calculated or estimated once the gear pump 20 in use and the type of elastomeric material that must be used in the extrusion cycle intended to deposit the semi-finished product 150 on the forming support 200 are known.

Typical numerical values of the gear pumps used in the extrusion methods of a semi-finished product made of elastomeric material used in processes for building tyres for vehicle wheels are as follows: 150 bar as maximum inlet pressure value PHIV and 30 bar as minimum inlet pressure value PLIV.

The maximum exit pressure value HEV, the minimum exit pressure value LEV, the predetermined maximum inlet pressure value PLIV and the predetermined minimum inlet pressure value PLIV are processed by the processing unit 30 to provide a predetermined pressure difference DP.

Such processing can be carried out by the processing unit 30 (as schematically represented in FIG. 2A), by a further processing unit (not illustrated) or manually by an operator.

In any case, the predetermined pressure difference DP is calculated according to the formula DP=[(HEV+LEV)/2]−[(PHIV+PLIV)/2], i.e. by subtracting an average inlet pressure value in the reference extrusion cycle from an average exit pressure value in the reference extrusion cycle.

At this point, it is possible, always through the extrusion device 10 and the same elastomeric material used during the reference extrusion cycle described above, to carry out the extrusion cycle aimed at depositing the semi-finished product 150 on the forming support 200 for building a tyre for vehicle wheels.

Firstly, the areas of the extrusion device 10 are thermoregulated to bring them to the respective operating temperature (preferably equal to those set in the reference extrusion cycle) and the forming support 200 is positioned close to the nozzle 21.

The motor group 16 is then activated.

The elastomeric material is fed to the hopper 18 and from here to the extrusion screw 15 and, thereafter, to the inlet channel 20*a* of the gear pump 20 proceeding along the feeding direction A. The elastomeric material is then pushed by the gear pump 20 into the exit channel 20*b* and then, through the nozzle 21, is deposited on the forming support 200.

As schematically illustrated in FIG. 2B, during the movement of the elastomeric material through the gear pump 20, the second sensor 27 detects the pressure of the elastomeric material in the exit channel 20*b* of the gear pump and sends to the processing unit 30 (or to a further processing unit) a PES signal representative of the detected exit pressure value PE.

The processing unit 30 thus calculates a reference inlet pressure value PIR as the difference between the exit pressure value PE and the predetermined pressure difference DP, according to the formula PIR=PE−DP.

If the reference inlet pressure value PIR is greater than the predetermined minimum inlet pressure value PLIV and less than the predetermined maximum inlet pressure value PHIV, the extrusion screw 15 is actuated by the motor group 16 at a rotation speed such as to generate in the inlet channel 20*a* of the gear pump 20 a pressure having a value equal or as close as possible to the exit pressure value PE minus the constant pressure value DP.

Preferably, the pressure generated in the inlet channel 20*a* is comprised between 98% and 102% of the exit pressure value PE minus the constant pressure value DP.

In the case in which the extrusion cycle is very similar to the reference extrusion cycle (as it is envisaged to happen normally, except for rare cases), the formula for the calculation of the predetermined pressure difference DP ensures that the reference inlet pressure value PIR is always comprised between the predetermined minimum inlet pressure value PLIV and the predetermined maximum inlet pressure value PHIV.

As an example, using the numerical values HEV=260 bar, LEV=150 bar of the first reference cycle exemplified above, and the typical numerical values PHIV=150 bar and PLIV=30 bar provided above, the formula for the calculation of the predetermined pressure difference DP gives a value of DP equal to 115 bar. Assuming that the extrusion cycle has a pressure curve similar to that of the reference extrusion cycle, the maximum exit pressure value PE detected by the second exit sensor 27 would be equal to 260 bar and the minimum exit pressure value PE detected by the second exit sensor 27 would be equal to 150 bar. The reference inlet pressure values PIR calculated as PIR=PE-DP would be comprised between 145 bar and 35 bar, thus always less than the predetermined maximum inlet pressure value PHIV and greater than the predetermined minimum inlet pressure value PLIV. It should be noted that the reference inlet pressure values PIR would be comprised between the predetermined minimum inlet pressure value PLIV and the predetermined maximum inlet pressure value PHIV even in the case in which the extrusion cycle has a maximum exit pressure value PE detected by the second exit sensor 27 and a minimum exit pressure value PE detected by the second sensor different from those indicated above, for example respectively equal to 265 bar and 145 bar.

Using the numerical values HEV=290 bar, LEV=180 bar of the second reference cycle exemplified above, and the typical numerical values PHIV=150 bar and PLIV=30 bar provided above, the formula for the calculation of the predetermined pressure difference DP gives a value of DP equal to 145 bar. Assuming that the extrusion cycle has a pressure curve similar to that of the reference extrusion cycle, the maximum exit pressure value PE detected by the second exit sensor 27 would be equal to 290 bar and the minimum exit pressure value PE detected by the second exit sensor 27 would be equal to 180 bar. The reference inlet pressure values PIR calculated as PIR=PE-DP would be comprised between 145 bar and 35 bar, thus always less than the predetermined maximum inlet pressure value PHIV and greater than the predetermined minimum inlet pressure value PLIV. It should be noted that the reference inlet pressure values PIR would be comprised between the predetermined minimum inlet pressure value PLIV and the predetermined maximum inlet pressure value PHIV even in the case in which the extrusion cycle has a maximum exit pressure value PE detected by the second exit sensor 27 and a minimum exit pressure value PE detected by the second exit sensor 27 different from those indicated above, for example respectively equal to 295 bar and 175 bar.

If the reference inlet pressure value PIR is lower than the predetermined minimum inlet pressure value PLIV (due to anomalies in the pressure curve of the extrusion cycle), the extrusion screw 15 is actuated by the motor group 16 at a rotation speed such as to generate in the inlet channel 20*a* of the gear pump 20 a pressure having a value equal or as close as possible to the predetermined minimum inlet pressure value PLIV.

Preferably, the pressure generated in the inlet channel 20*a* is comprised between 98% and 102% of the predetermined minimum inlet pressure value PLIV.

If the reference inlet pressure value PIR is greater than the predetermined maximum inlet pressure value PHIV (due to anomalies in the pressure curve of the extrusion cycle), the extrusion screw 15 is actuated by the motor group 16 at a rotation speed such as to generate in the inlet channel 20*a* a pressure having a value equal or as close as possible to the predetermined maximum inlet pressure value PHIV.

Preferably, the pressure generated in the inlet channel 20*a* is comprised between 98% and 102% of the predetermined maximum inlet pressure value PHIV.

The detection of the exit pressure value PE and the calculation of the reference inlet pressure value PIR are continuously carried out during the entire extrusion cycle, preferably at predetermined and sufficiently short time intervals to obtain a continuous adjustment of the inlet pressure value in the inlet channel 20*a* of the gear pump 20.

For example, such predetermined time intervals are equal to each other and comprised between 0.01 s e 0.1 s.

In this way, the inlet pressure value in the inlet channel 20*a* of the gear pump 20 substantially corresponds to the exit pressure value PE in the exit channel 20*b* of the gear pump 20 minus the predetermined pressure difference DP. The gear pump 20 thus works with a certain instantaneous yield. This is schematically illustrated in the graph of FIG. 3, which shows how by suitably controlling the speed of the extrusion screw 15 (curve with solid thin line) it is possible to ensure that, after an initial transient, the inlet pressure of the gear pump 20 (curve with dotted and dashed line) follows, with a predetermined pressure difference, the exit pressure of the gear pump 20 (curve with dashed line), obtaining a substantial constancy of the flow rate of the extruded elastomeric material (curve with solid thick line) and, therefore, a certain instantaneous yield of the gear pump 20.

The only deviations permitted by such a constant instantaneous yield of the gear pump 20 happen in the case in which the reference inlet pressure value PIR in the inlet channel 20*a* is less than the predetermined minimum inlet pressure value PLIV or greater than the predetermined maximum inlet pressure value PHIV.

Once the deposition of the semi-finished product 150 on the forming support 200 is complete, the extrusion device 10 is deactivated, interrupting the extrusion process, and the forming support 200 is picked up and taken away from the extrusion device 10 to proceed with the subsequent building steps of the tyre.

A new extrusion cycle can start again, repeating the operations described above identically, following the positioning of a new forming support in the position previously occupied by the forming support 200. The reference extrusion cycle is carried out when the type of elastomeric material to be extruded is changed, since there is no need to repeat a reference extrusion cycle before every new extrusion cycle that deposits semi-finished product on a same or different forming supports.

The Applicant carried out a test in which a same extrusion device was used and in which some extrusion cycles were repeated with the same elastomeric material.

In accordance with the test, a first group of extrusion cycles was carried out by setting a constant inlet pressure in the inlet channel of the gear pump and a second group of extrusion cycles was carried out in accordance with the extrusion method of the present invention.

The extrusion cycles of the first group of extrusion cycles were carried out with different time intervals between one cycle and the next cycle. The same time intervals between one extrusion cycle and the next were set between the extrusion cycles of the second group of extrusion cycles.

At the end of every extrusion cycle the extruded elastomeric material was weighed.

The test highlighted that the weight difference between the extrusion cycle in which more elastomeric material was deposited and the extrusion cycle in which less elastomeric material was deposited in the second group of extrusion cycles (according to the invention) was less than about 85% with respect to the weight difference between the extrusion cycle in which more elastomeric material was deposited and the extrusion cycle in which less elastomeric material was deposited in the first group of extrusion cycles.

Such a test thus highlighted that the method of the present invention makes it possible to achieve the desired constancy of flow rate during repeated extrusion cycles.

The present invention has been described with reference to some preferred embodiments. Different modifications can be made to the embodiments described above, while remaining within the scope of protection of the invention, defined by the following claims.

The invention claimed is:

1. A method for extruding a semi-finished product made of elastomeric material, comprising:

predetermining a minimum exit pressure value and a maximum exit pressure value by performing at least one reference extrusion cycle;

calculating a predetermined pressure difference as a function of an average of said minimum exit pressure value and maximum exit pressure value;

feeding an elastomeric material to an inlet channel of a gear pump, the elastomeric material having, in said inlet channel, an inlet pressure value;

dispensing said elastomeric material through an exit channel of the gear pump, the elastomeric material having, in said exit channel, an exit pressure value greater than the inlet pressure value;

detecting said exit pressure value;

adjusting operation of said gear pump to maintain said predetermined pressure difference between exit pressure and inlet pressure of the elastomeric material based on said detecting, wherein said performing at least one reference extrusion cycle is performed before feeding the elastomeric material to said inlet channel.

2. The method according to claim 1, wherein said reference extrusion cycle is performed through said gear pump.

3. The method according to claim 1, wherein said reference extrusion cycle is performed with said elastomeric material.

4. The method according to claim 1, wherein said predetermined pressure difference (DP) is calculated according to a formula DP=[(HEV+LEV)/2]−[(PHIV+PLIV)/2], where HEV indicates said maximum exit pressure value, LEV indicates said minimum exit pressure value, PHIV indicates a predetermined maximum inlet pressure value and PLIV indicates a predetermined minimum inlet pressure value.

5. The method according to claim 1, wherein the detecting the exit pressure value is repeated continuously during feeding said elastomeric material.

6. The method according to claim 1, wherein the adjusting the operation of said gear pump comprises adjusting rotation speed of an extrusion screw configured to feed the elastomeric material to the gear pump.

7. A process for building a tyre for vehicle wheels, comprising:

manufacturing a semi-finished product made of elastomeric material; and depositing the semi-finished product made of elastomeric material on a forming support, wherein the manufacturing comprises performing the method according to claim 1.

8. The method according to claim 1, comprising:

before feeding the elastomeric material to said inlet channel, setting a predetermined minimum inlet pressure value and a predetermined maximum inlet pressure value; and after the detecting of the exit pressure value, calculating a reference inlet pressure value as the difference between the exit pressure value and said predetermined pressure difference.

9. The method according to claim 8, wherein when the reference inlet pressure value is greater than the predetermined minimum inlet pressure value and lower than the predetermined maximum inlet pressure value, the difference between the exit pressure value and the inlet pressure value is set as equal to said predetermined pressure difference.

10. The method according to claim 8, wherein when the reference inlet pressure value is lower than said predetermined minimum inlet pressure value, the inlet pressure is adjusted so that the inlet pressure value is set as equal to said predetermined minimum inlet pressure value.

11. The method according to claim 8, wherein when the reference inlet pressure value is greater than said predetermined maximum inlet pressure value, the inlet pressure is adjusted so that the inlet pressure value is set as equal to said predetermined maximum inlet pressure value.

12. The method according to claim 8, wherein said predetermined minimum inlet pressure value is equal to, or greater than, 20 bar.

13. The method according to claim 8, wherein said predetermined maximum inlet pressure value is equal to, or lower than, 200 bar.

14. A method for extruding a semi-finished product made of elastomeric material, comprising:

performing a reference extrusion cycle by extruding a reference elastomeric material of a first type through a gear pump to predetermine a minimum exit pressure value and a maximum exit pressure value;

calculating a predetermined pressure difference as a function of said minimum exit pressure value and said maximum exit pressure value;

after completing said reference extrusion cycle, feeding an elastomeric material of the first type to an inlet channel of said gear pump, the elastomeric material of the first type having, in said inlet channel, an inlet pressure value;

dispensing said elastomeric material of the first type through an exit channel of said gear pump, the elastomeric material of the first type having, in said exit channel, an exit pressure value greater than the inlet pressure value;

detecting said exit pressure value; and adjusting operation of said gear pump to maintain said predetermined pressure difference between said exit pressure value and said inlet pressure value based on said detecting.

15. The method according to claim 14, further comprising:

performing a second reference extrusion cycle by extruding a reference elastomeric material of a second type through said gear pump, prior to feeding an elastomeric material of the second type to said inlet channel.

* * * * *